(12) United States Patent
Das et al.

(10) Patent No.: US 9,681,412 B2
(45) Date of Patent: Jun. 13, 2017

(54) METHOD AND DEVICE FOR PROVIDING A MOBILE DEVICE WITH SERVICE CONTINUITY OVER MULTIPLE ACCESS NETWORKS

(71) Applicant: AT&T Intellectual Property I, LP, Atlanta, GA (US)

(72) Inventors: Jayanta Das, Morganville, NJ (US); Vandana S. Chakravarti, Marlboro, NJ (US); Vimal Patel, Morganville, NJ (US); Glenn Petry, Albertson, NY (US); Feza H. Buyukdura, Fairview, TX (US); James Ibezim, Wayside, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 43 days.

(21) Appl. No.: 14/299,466

(22) Filed: Jun. 9, 2014

(65) Prior Publication Data

US 2015/0312874 A1    Oct. 29, 2015

Related U.S. Application Data

(60) Provisional application No. 61/983,435, filed on Apr. 23, 2014.

(51) Int. Cl.
| | |
|---|---|
| *H04W 4/00* | (2009.01) |
| *H04W 60/00* | (2009.01) |
| *H04W 4/02* | (2009.01) |
| *H04L 29/06* | (2006.01) |
| *H04W 60/04* | (2009.01) |

(52) U.S. Cl.
CPC ....... *H04W 60/005* (2013.01); *H04L 65/1016* (2013.01); *H04W 4/02* (2013.01); *H04W 60/04* (2013.01)

(58) Field of Classification Search
CPC . H04W 36/0066; H04W 60/005; H04W 4/02; H04W 60/04; H04W 88/10; H04L 65/1016
USPC ...... 455/435.1, 424, 558, 435.2, 435.3, 436, 455/437–443
See application file for complete search history.

(56) References Cited

U.S. PATENT DOCUMENTS

| | | | |
|---|---|---|---|
| 7,522,921 B2 * | 4/2009 | Thompson | .................... 455/433 |
| 8,306,531 B2 | 11/2012 | Zhu et al. | |
| 8,374,173 B2 | 2/2013 | Sedlacek et al. | |
| 8,401,552 B2 | 3/2013 | Russell et al. | |
| 8,437,342 B2 | 5/2013 | Jonsson et al. | |
| 8,472,376 B2 | 6/2013 | Przybysz | |

(Continued)

OTHER PUBLICATIONS

Noldus, Rogier et al., "Multi-access for the IMS network", Ericsson Review 2 (2008): 81-86.

(Continued)

*Primary Examiner* — Lester Kincaid
*Assistant Examiner* — Sayed T Zewari
(74) *Attorney, Agent, or Firm* — Jay Anderson; Guntin & Gust, PLC

(57) ABSTRACT

Aspects of the subject disclosure may include, for example, registering with a first access network to generate a first registration, detecting a triggering event, and registering with a second access network to generate a second registration while maintaining the first registration with the first access network. Other embodiments are disclosed.

20 Claims, 10 Drawing Sheets

(56) References Cited

U.S. PATENT DOCUMENTS

| | | |
|---|---|---|
| 8,478,886 B2 | 7/2013 | Deshpande et al. |
| 8,489,743 B2 | 7/2013 | Aström et al. |
| 8,514,870 B2 | 8/2013 | Ma et al. |
| 8,542,678 B2 | 9/2013 | Buckley |
| 8,594,105 B1 | 11/2013 | Breau et al. |
| 8,660,091 B2 | 2/2014 | Lindholm et al. |
| 2005/0070288 A1* | 3/2005 | Belkin et al. ............... 455/439 |
| 2008/0037501 A1 | 2/2008 | Ali et al. |
| 2009/0325572 A1* | 12/2009 | Ji ........................ H04W 24/06 455/424 |
| 2010/0263032 A1 | 10/2010 | Bhuyan et al. |
| 2013/0028179 A1 | 1/2013 | Sedlacek et al. |
| 2013/0295920 A1* | 11/2013 | Viswanadham ...... H04W 36/14 455/426.1 |

OTHER PUBLICATIONS

Tabany, Myasar R. et al., "Performance Analysis and Deployment of VoLTE Mechanisms over 3GPP LTE-based Networks", International Journal of Computer Science and Telecommunications, vol. 4, Issue 10, Oct. 2013.

\* cited by examiner

100

200

300

400

500

600

METHOD AND DEVICE FOR PROVIDING A MOBILE DEVICE WITH SERVICE CONTINUITY OVER MULTIPLE ACCESS NETWORKS

CROSS-REFERENCE TO RELATED APPLICATIONS

This application claims the benefit of U.S. Provisional Application Ser. No. 61/983,435 filed Apr. 23, 2014, the disclosure of which is incorporated herein by reference in its entirety.

FIELD OF THE DISCLOSURE

The subject disclosure relates to a method and device for providing a mobile device with service continuity over multiple access networks.

BACKGROUND

Communication of voice, video, messaging and/or data can be performed over different types of networks utilizing different access technologies. These access networks and access technologies have benefits, as well as detriments, when compared to each other.

BRIEF DESCRIPTION OF THE DRAWINGS

Reference will now be made to the accompanying drawings, which are not necessarily drawn to scale, and wherein.

DETAILED DESCRIPTION

Figure 1:
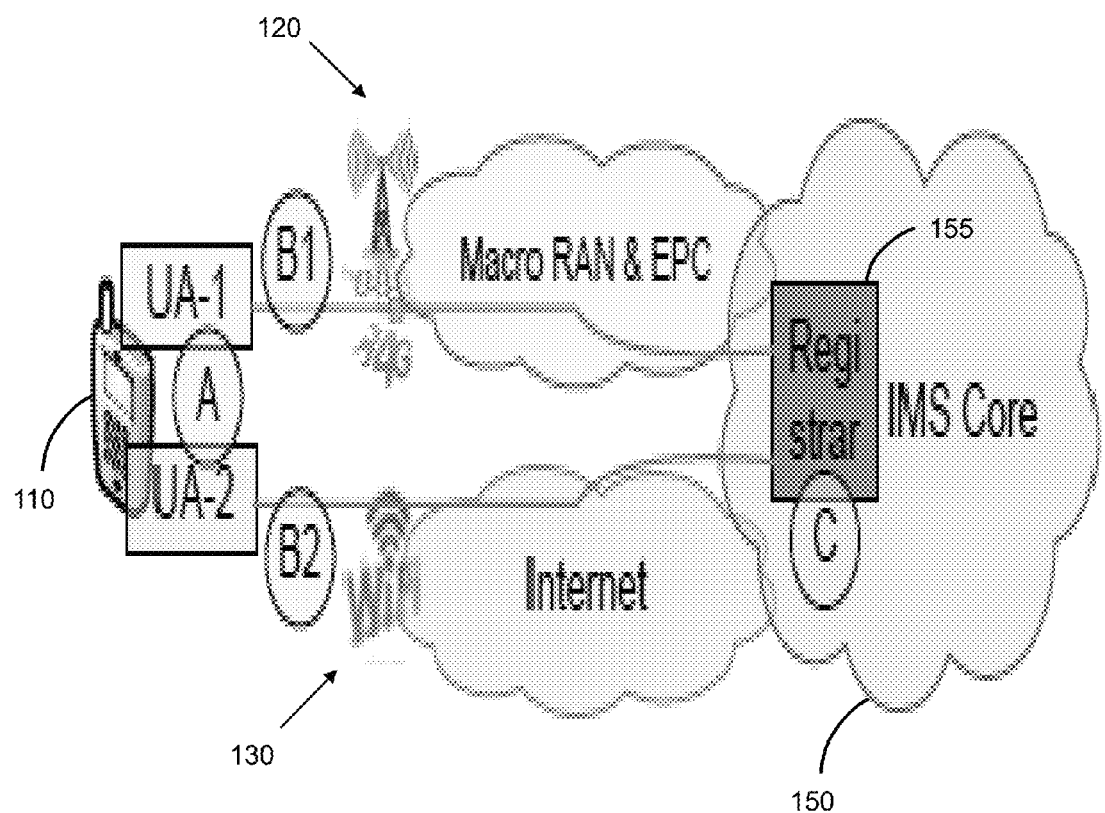
FIG. 1 depicts an illustrative embodiment of a system that provides for service continuity over different access networks utilizing co-registration.

The subject disclosure describes, among other things, illustrative embodiments for providing service continuity for a communication device over different access networks. One or more of the exemplary embodiments can provide end to end Internet Protocol Multimedia System (IMS) service layer adjustments to enable seamless service offerings across different access networks. Other embodiments are described in the subject disclosure.

One or more aspects of the subject disclosure can supports dual or multiple registrations for each (or some) of the available access networks (e.g., within reach and acceptable credential) of the communication device. The registration can be of a device to a network to enable any number of communication services, including voice, video, data and/or messaging. The registrations can be of various types, such as a registration related to the OSI layers (e.g., one or more of layers 3-7 of the OSI model) including related to the user application, device, or the user. Registration can include re-establishing a communication relationship, such as based on a user application, user device and/or user. Registration can include associating a user to a service profile (e.g., billing, features, priorities, and so forth). Registration can include enabling an application or content service. Registration can include associating a user to a group (e.g., social media).

One or more aspects of the subject disclosure can include a Session Initiation Protocol (SIP) implementation that supports dual or multiple SIP registrations for each (or some) of the available access networks (e.g., within reach and acceptable credential) of the communication device. The communication device may be referred to herein as a mobile device, however, one or more of the exemplary embodiments can be utilized with various types of communication devices (e.g., fixed or mobile end user devices including smart phones, tablets, laptop computers, PDAs, desktop computers, vehicle computing devices, and so forth) that provide wireless voice, video, messaging and/or data services. One or more of the exemplary embodiments can provide for SIP registration procedures at the mobile device internal SIP platform and/or at the operator's IMS Core Network (CN).

One or more of the exemplary embodiments can enable an end user device to provide service continuity when transferring to different access networks where co-registration has occurred with those different access networks. The service continuity can include providing the same service, such as transferring a voice/video call over different access networks, or can including providing different services such as starting with a voice call over a first access network and (based on co-registration) switching to a video call over a second access network.

One or more of the exemplary embodiments can support multiple SIP registrations at the device platform using the same IP Multimedia Service Identity Module (ISIM) secret or Ki (subscriber key) for each (or a selected group) of accessible access networks (e.g., both reach and security credential), such as a Macro LTE RAN and a WiFi hotspot. The multiple SIP registrations can be maintained simultaneously as applicable to the same SIP Registrar in the IMS CN.

Some of the exemplary embodiments are described with respect to a SIP registration that enables co-pending registration for multiple access networks. One or more of the exemplary embodiments can provide for a co-registration process for multiple access networks that utilizes protocols, standards or techniques other than SIP to enable an end user device (e.g., via dedicated or non-dedicated user agents) to initiate and maintain at the same time two or more registrations for different access networks.

One or more of the exemplary embodiments can enable co-registration of the same types of access networks that are otherwise different networks, such as co-registration of first and second WiFi access networks that are managed by different service providers. The end user device and/or the network(s) can then determine which of the access networks will be utilized for maintaining service continuity when the access network switch occurs, such as based on user preferences, service provider agreements with each other, network conditions at each of the access networks, and so forth.

One or more of the exemplary embodiments can utilize a co-registration process to enable service continuity over multiple access networks where the service is adjusted responsive to the switching between access networks. As an example, an end user device may initiate a voice call communication session utilizing a first access network. A co-registration of a second access network (while the registration of the first access network is maintained) can occur such as during the communication session. A triggering event can be detected causing a transfer of the communication session from the first access network to the second access network. Additionally, the communication session can be adjusted to include video conferencing over the second access network. The adjustment of the type of service (in this example from a voice call to a voice/video call) at the second access network can be based on a number of factors, such as signal quality, costs, subscriber agreements, end user preferences, network traffic conditions, device compatibility, and so forth.

One or more of the exemplary embodiments can enable, such as at the device platform, the device Native Dialer or other connectivity agent to initiate a communication session, such as an IMS call via an SIP Invite on the appropriate or desired transport for Mobile Originated (MO) call. The selection of the appropriate or desired access network can be made by the mobile device and/or the network, including based on user's preference, end user performance parameters, network preferences, and/or network performance parameters (e.g., via an algorithmic computation of performance metrics).

One or more of the exemplary embodiments can, such as at the device platform, support using a derived IMS Private ID (IMPI) from the ISIM module's IMPI parameter (e.g., imsi_wifi@private.serviceprovidername.net where "_wifi" is the added suffix and thus derived.

One or more of the exemplary embodiments can, such as at the IMS CN, support multiple SIP Registrations to the same IMS Proxy Server from multiple User Agents (UAs) at the same mobile device utilizing the same IMPU (IMS Public User Id) as for macro RAN (such as a HSPA+, LTE, and so forth) but different IMPIs on the UE.

One or more of the exemplary embodiments can, such as at the IMS CN (e.g., at the IMS Home Subscriber Server (HSS), support management of subscriber's secret or key (Ki) to maintain 'synch state' of both RAN and WiFi access (or other network access) for follow-up registration and/or (re)-registration.

One or more of the exemplary embodiments can, such as at the IMS CN (e.g., at the IMS-HSS), process the Diameter User Authentication Request (UAR) with different IMPI for a 2nd (or more) SIP Registration such as over WiFi, without (in parallel with the $1^{st}$ SIP registration over Macro LTE network) nullifying the 1st SIP Registration which was over macro LTE. The exemplary embodiments can also process subsequent SIP registration(s) without nullifying earlier SIP registration(s) for other types of access networks, including WiMAX networks or wireless local area networks. One or more of the exemplary embodiments can enable some access networks (e.g., a WiFi network) to automatically unregister (such as after expiration of a timer) without utilizing an active de-registration for that access network. In one or more embodiments, a registration with RAN can always be maintained while a co-registration with other access networks (such as a WiFi network or a WiMAX network) can be selectively maintained. In one or more embodiments, the co-registration with multiple access networks can be selectively maintained, such as based on device location, user preferences, device performance parameters, network preferences, network performance parameters, and so forth. As an example, a mobile device can originally be registered with a RAN and based on a change of location of the mobile device a second registration can occur (such as with a WiFi network available in the new location) while the first registration with the RAN is maintained.

One or more of the exemplary embodiments can, such as at the IMS CN, route an incoming call over a preferred access network. This example can be based on registration states for the different available access networks associated with the SIP Registrar.

One or more of the exemplary embodiments can provide an operator with flexibility to offer IMS services (e.g., VoIP, Video over IP, and so forth) in a manner that facilitates billing and/or conserves macro RAN capacity. One or more of the exemplary embodiments can provide a user with a higher value user experience depending on the quality of macro RAN coverage such as in a situation where WiFi may offer improved quality (e.g., in a home environment). One or more of the exemplary embodiments can enable, via dual or multiple registration, service provider(s) to determine best or better path for the particular service or function being requested, such as implementing LTE/RAN functionality over WiFi when it makes sense (e.g., 911 support functionality).

One or more of the exemplary embodiments can maintain any number of simultaneous (e.g., at the same time) SIP registrations to the IMS CN to provide multiple benefits to the operator and/or to the mobile end user. The exemplary embodiments can be utilized in conjunction with one or more processes described in the 3GPP TS 24.229 standard, the disclosure of which is hereby incorporated by reference.

One embodiment of the subject disclosure is a device that includes a processor; and a memory that stores executable instructions that, when executed by the processor, facilitate performance of operations, including registering with a first access network to generate a first registration. The device can detect a triggering event, and can register with a second access network (responsive to the detecting of the triggering event) to generate a second registration while maintaining the first registration with the first access network.

One embodiment of the subject disclosure includes machine-readable storage medium, comprising executable instructions that, when executed by a processor of a mobile device, facilitate performance of operations, including determining to transfer a communication session of the mobile device from a first access network to a second access network where the mobile device is registered with the first and second access networks. The processor can initiate a message from a dedicated user agent corresponding to one of the first or second access networks, thereby causing the transfer of a communication session from the first access network to the second access network, where the dedicated user agent is resident on the mobile device, and where the message is one of an INVITE message or a REFER-to message.

One embodiment of the subject disclosure is a method that includes receiving, by a system including a processor, a first registration message initiated from a mobile device. The method includes registering, by the system, the mobile device with a first access network to generate a first registration in response to the first registration message. The method includes receiving, by the system, a second registration message initiated from the mobile device. The method includes registering, by the system, the mobile device with a second access network to generate a second registration in response to the second registration message, where the first registration of the mobile device with the first access network is maintained by the system.

FIG. 1 depicts an illustrative embodiment of a system 100 that enables an end user device 110, such as a mobile device, to provide service continuity over multiple access networks, such as network 120 (e.g., a macro RAN and EPC network) and network 130 (e.g., a WiFi Internet access network). In this embodiment, the end user device 110 includes hardware and/or a platform that is capable of running SIP stack simultaneously or in an otherwise overlapping fashion. In one or more embodiments, the end user device 110 can support dedicated SIP User Agents (UAs) for each accessible access network. For example, UA-1 and UA-2 can be respectively dedicated for the Macro RAN and WiFi access, respectively. Any number of dedicated user agents can be utilized. In one or more embodiments, non-dedicated user agents can be utilized such as a user agent that is applicable to a group of access networks (e.g., access networks that require similar registration processes). In other embodiments, a combination of dedicated user agent(s) and non-dedicated user agent(s) can be executed by the end user device 110 to facilitate interacting with the access networks.

Reference letters B1 and B2 in FIG. 1 indicate SIP REGISTER signaling flow initiated by the UAs over their respective access network, e.g., as needed and/or as accessible/available. In this embodiment, B1 is a SIP REGISTER over the Macro RAN while B2 is a SIP REGISTER over the WiFi network. In this example, the processing of the SIP registrations is denoted by reference C where a proxy SIP REGISTRAR server 155 in an IMS Core 150 can support processing of both B1 and B2 SIP REGISTER flows and can maintain the respective states of the registrations for future communication sessions as triggered by a SIP INVITE.

In this embodiment, the SIP REGISTER signaling flow initiated by the UAs over their respective access network can be triggered by various events which can be monitored by the end user device 110, the network(s), or both. In one embodiment, the triggering event can be based on device location, such as when the end user device 110 moves within a coverage area of a new access network. As another example, the triggering event can be based on an end user preference (e.g., a user prefers to utilize WiFi over another access network such as due to different billing rates) and/or based on an end user device preference and/or performance parameter (e.g., falling below a threshold for QoS or signal strength detected by the end user device 110, available battery power, compatibility of the end user device with the access network such as device capabilities being fully usable with one of the access networks, and so forth). As yet another example, the triggering event can be based on network preferences and/or network performance parameters. For instance, a RAN (e.g., a monitoring system of the RAN) can detect heavy network traffic in a particular area and can desire to move a number of end user devices to alternative access networks, such as to alleviate workload of one or more network elements associated with an overloaded access network. In one embodiment, this movement of end user devices to another access network(s) can be performed in conjunction with user preferences and/or end user device performance parameters, such as switching to a new access network only those devices that have provided authorization for doing so (e.g., authorization included in a subscriber agreement and/or included in a user profile). Other triggering events can also be utilized for initiating a second or more co-registration, including triggering events monitored by the end user device, the network and/or one or more third party entities.

Figure 2:
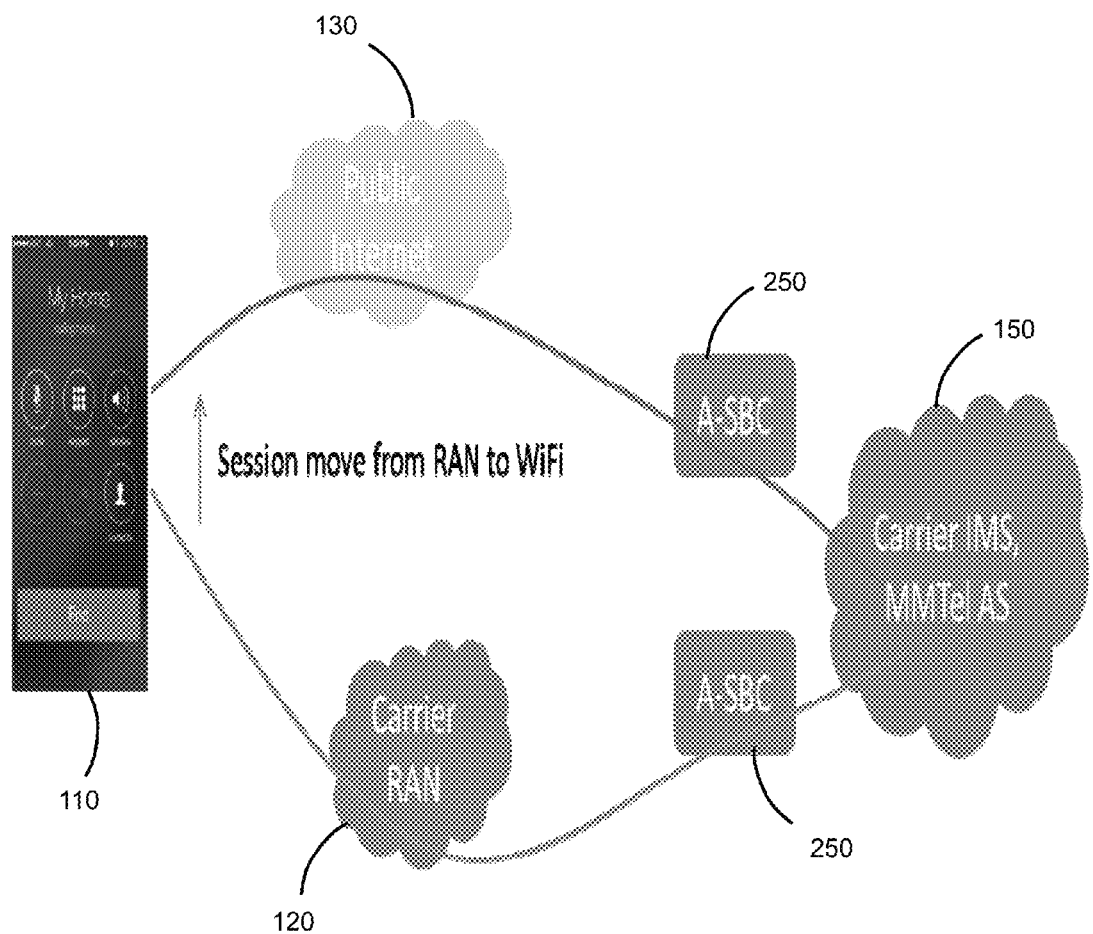
FIG. 2 depicts an illustrative embodiment of a system that provides for service continuity over a Radio Access Network (RAN) and WiFi network utilizing co-registration.

FIG. 2 depicts an illustrative embodiment of a system 200 in which service continuity is provided to the end user device 110 for a communication session that is moved from a RAN network 120 to a WiFi network 130. It should be understood that various networks utilizing various wireless technologies can be utilized in this embodiment, in addition to or in place of one or both of the RAN and WiFi networks 120, 130. The communication session can be of various types including voice, video, messaging and/or data services. In one embodiment, responsive to the end user device 110 moving into or towards a WiFi footprint, the WiFi user agent (or other user agent that processes WiFi access network registration) can register to the IMS via Internet access with the Globally Routable User (agent) URI (GRUU). However, the triggering of the co-registration can also be based on other factors in conjunction with device location or in place of device location, such as network traffic management, end user preferences, communication session types, service agreements, quality of service management, and so forth. In this example, the end user device 110 can be active on a call over RAN access using a RAN client. The end user device 110 can detect a WiFi access when the end user device moves into (or toward) the WiFi coverage area. The end user device 110 can register the WiFi client with another private ID, same Authentication and Key Agreement (AKA) AKA in SIM and GRUU to the IMS core 150 such as via an access session border control 250. In one embodiment, the location information utilized as a triggering event can be based on an estimated trajectory of the end user device 110, such as initiating a co-registration process according to a detection that the end user device will enter a WiFi coverage area very soon because the end user device is moving toward the WiFi coverage area at a particular speed.

In one embodiment utilizing a pull method, the WiFi client can send an Invite with Replace over WiFi access to replace the RAN session. In another embodiment utilizing a push method, the RAN client can send REFER with Refer-to point to the WiFi client. The MMTel Application Server (AS) or other network device can then move the session from the RAN to the WiFi access network. As explained above, the communication session can be any type of session including voice, video, messaging and/or data services. The particular types of messages that are utilized for the co-registration process and/or for the switching between access networks can vary, such as based on the signaling protocol that is being utilized.

Figure 3:
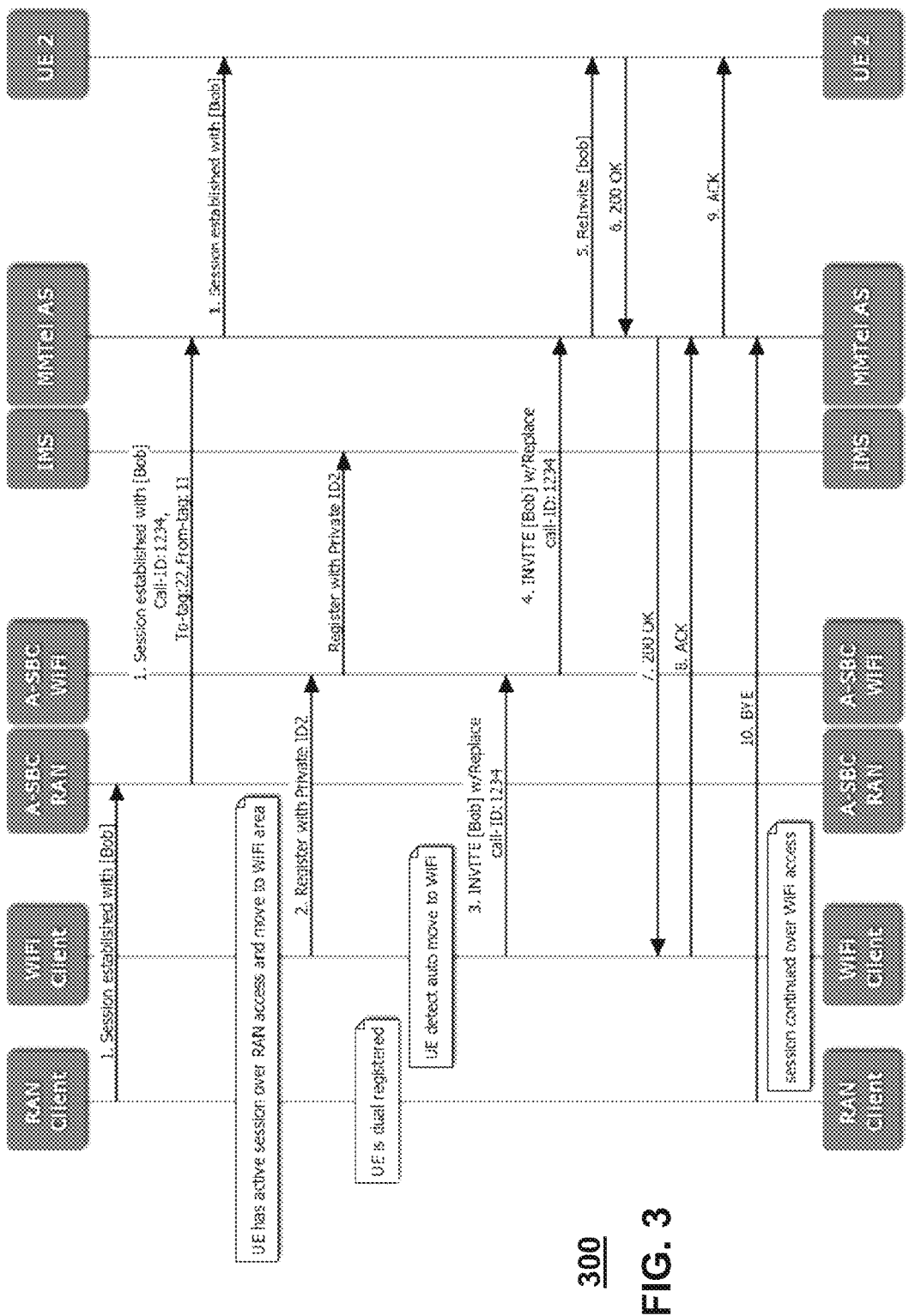
FIG. 3 depicts an illustrative embodiment of signal flow 300 in a pull method for service continuity from a RAN to a WiFi network

FIG. 3 depicts an illustrative embodiment of signal flow 300 in a pull method for service continuity from a RAN to a WiFi network. In this example, the service is a voice call, however, the exemplary embodiments can be utilized with various services including voice, video, messaging and/or data. The exemplary embodiments can be utilized to provide service continuity between other types of networks such as a WiMAX network, as well as between more than two access networks such as from a RAN to a WiFi network and back to the RAN or to another access network, such as a WiMAX network.

Signal flow 300 depicts steps 1 which are initiated by the RAN client on the end user device which result in an active session over the RAN with the second end user device. In this example, responsive to movement of the end user device to a new location (although other triggering events can also cause or be a factor in the co-registration occurring), steps 2 are performed which are initiated by the WiFi client of the end user device and which result in the co-registration (or dual registration in this example) of the end user device with both the RAN and the WiFi networks.

In this example of signal flow 300, an automatic movement to the WiFi access network can be detected resulting in an INVITE message being initiated by the WiFi client in step 3 and further resulting in steps 4-10 thereby continuing the communication session over the WiFi access network. The exemplary embodiments can utilize various triggering events for step 3, such as user preferences, end user device performance parameters, network preferences, and/or network performance parameters. In one or more embodiments, the signaling can follow in part one or more standards. For example, one or more of steps 4-10 can be similar to signaling steps utilized by the 3GPP TS 24.229 standard, such as recipients of the messages and/or information being transferred in the messages.

Figure 4:
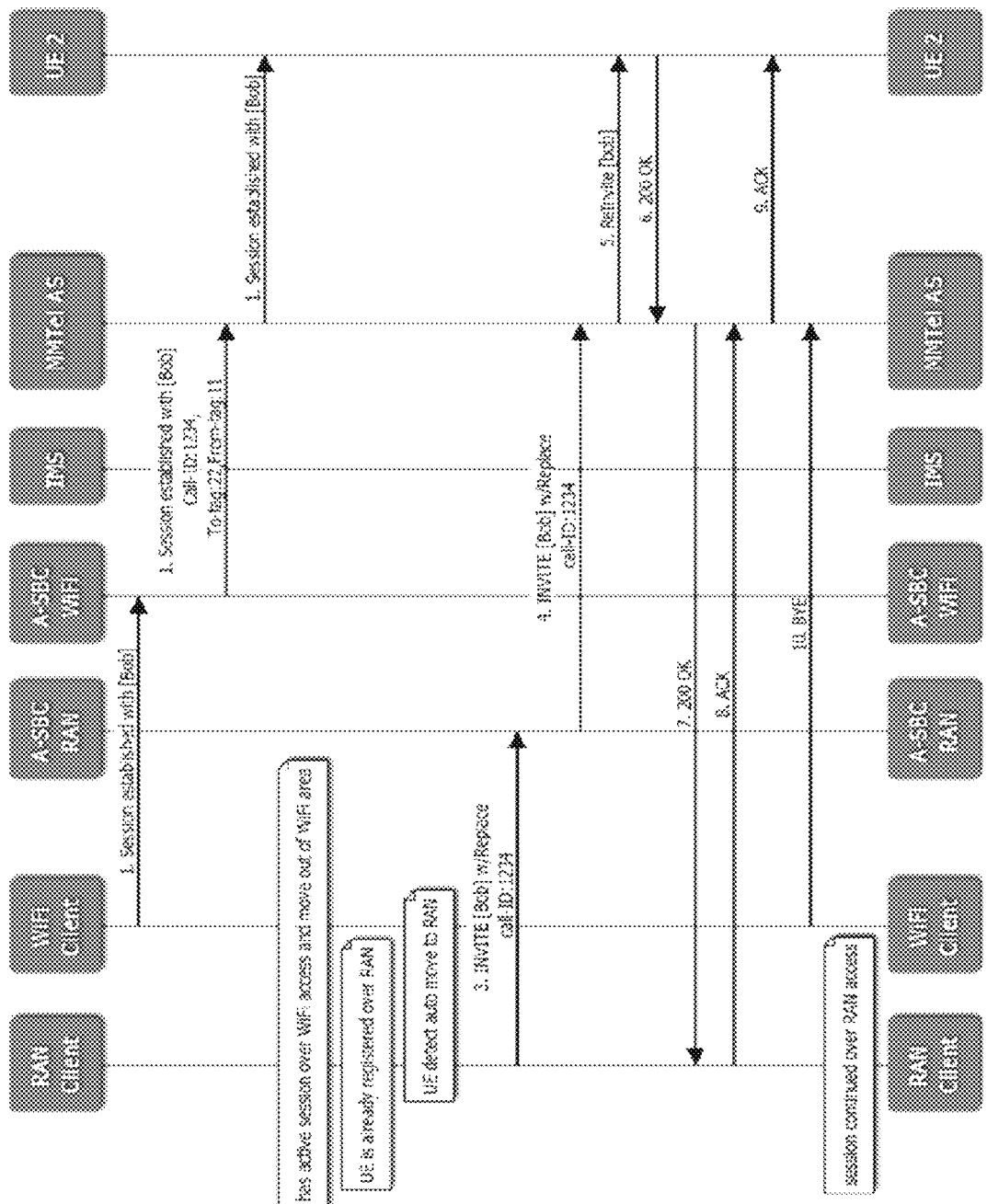
FIG. 4 depicts an illustrative embodiment of signal flow 400 in a pull method for service continuity from a WiFi network to a RAN.

FIG. 4 depicts an illustrative embodiment of signal flow 400 in a pull method for service continuity from a WiFi network to a RAN. In this example, the service is a voice call, however, the exemplary embodiments can be utilized with various services including voice, video, messaging and/or data. The exemplary embodiments can be utilized to provide service continuity between other types of networks such as a WiMAX network, as well as between more than two access networks such as from a RAN to a WiFi network and back to the RAN or to another access network, such as a WiMAX network.

Signal flow 400 depicts steps 1 which are initiated by the WiFi client on the end user device which result in an active session over the WiFi network with the second end user device. In this example, the end user device is already registered with the RAN and the end user device moves out of or towards the boundary of the WiFi coverage area. An automatic movement to the RAN can be detected resulting in an INVITE message being initiated by the RAN client in step 3 and further resulting in steps 4-10 thereby continuing the communication session over the RAN. The exemplary embodiments can utilize various triggering events for step 3, such as user preferences, end user device performance parameters, network preferences, and/or network performance parameters. In one or more embodiments, the signaling can follow in part one or more standards. For example, one or more of steps 4-10 can be similar to signaling steps utilized by the 3GPP TS 24.229 standard, such as recipients of the messages and/or information being transferred in the messages.

Figure 5:
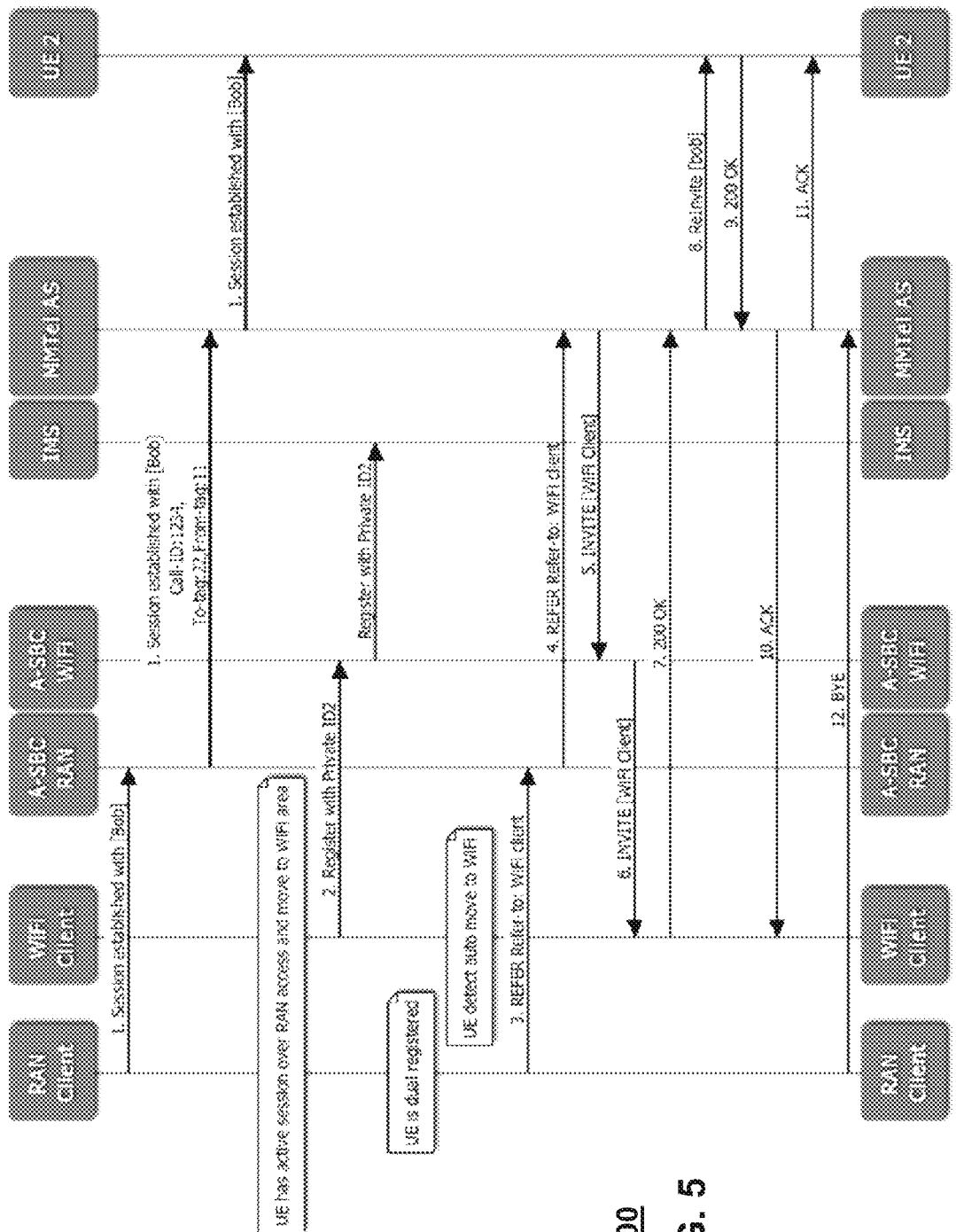
FIG. 5 depicts an illustrative embodiment of signal flow 500 in a push method for service continuity from a RAN to a WiFi network.

FIG. 5 depicts an illustrative embodiment of signal flow 500 in a push method for service continuity from a RAN to a WiFi network. In this example, the service is a voice call, however, the exemplary embodiments can be utilized with various services including voice, video, messaging and/or data. The exemplary embodiments can be utilized to provide service continuity between other types of networks such as a WiMAX network, as well as between more than two access networks such as from a RAN to a WiFi network and back to the RAN or to another access network, such as a WiMAX network.

Signal flow 500 depicts steps 1 which are initiated by the RAN client on the end user device which result in an active session over the RAN with the second end user device. In this example, responsive to movement of the end user device to a new location (although other triggering events can also cause or be a factor in the co-registration occurring), steps 2 are performed which are initiated by the WiFi client of the end user device and which result in the co-registration (or dual registration in this example) of the end user device with both the RAN and the WiFi networks.

In this example of signal flow 500, an automatic movement to the WiFi access network can be detected resulting in a REFER-to message being initiated by the RAN client in step 3 and further resulting in steps 4-10 thereby continuing the communication session over the WiFi access network. The exemplary embodiments can utilize various triggering events for step 3, such as user preferences, end user device performance parameters, network preferences, and/or network performance parameters. In one or more embodiments, the signaling can follow in part one or more standards. For example, one or more of steps 4-10 can be similar to signaling steps utilized by the 3GPP TS 24.229 standard, such as recipients of the messages and/or information being transferred in the messages.

Figure 6:
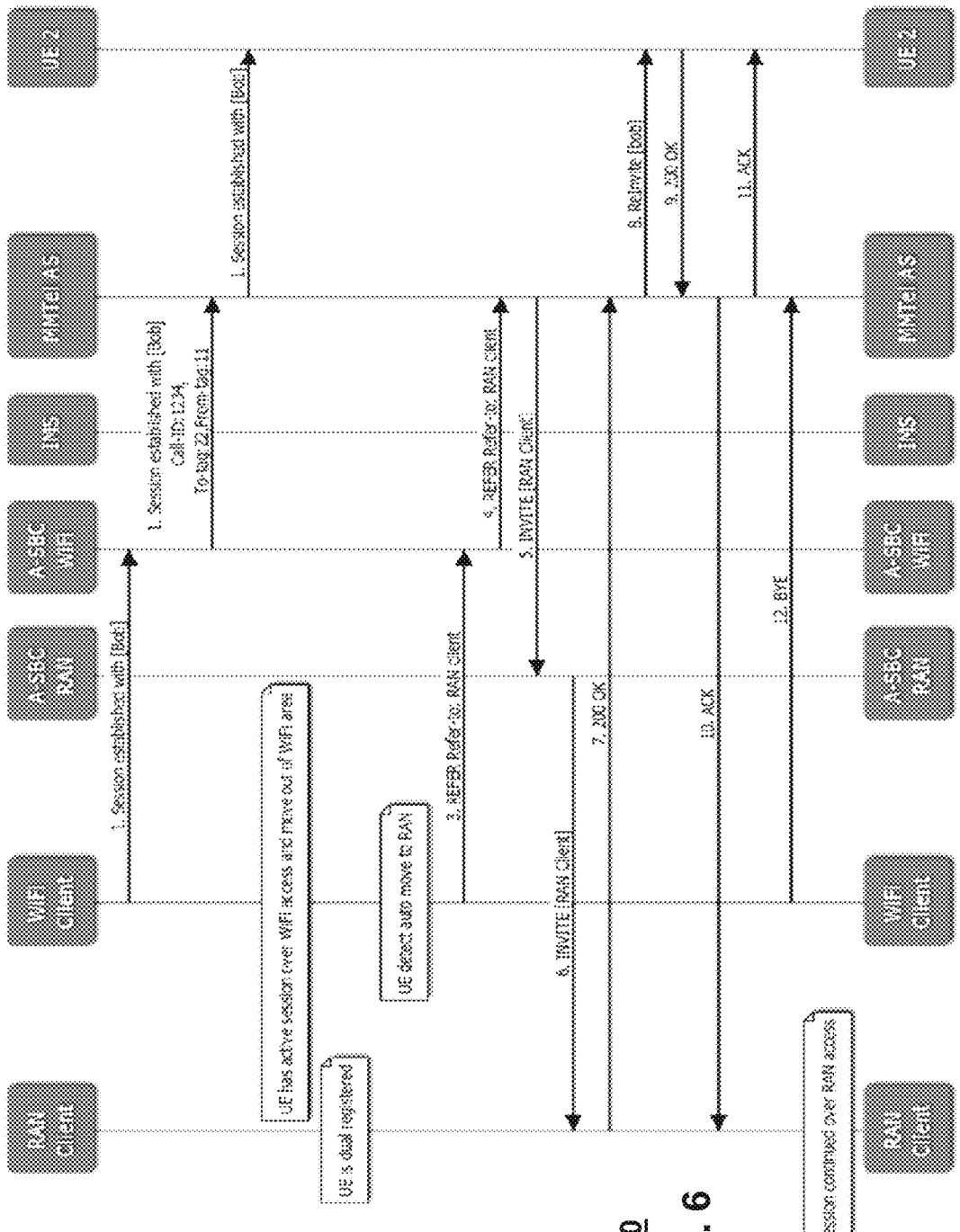
FIG. 6 depicts an illustrative embodiment of signal flow 600 in a push method for service continuity from a WiFi network to a RAN.

FIG. 6 depicts an illustrative embodiment of signal flow 600 in a push method for service continuity from a WiFi network to a RAN. In this example, the service is a voice call, however, the exemplary embodiments can be utilized with various services including voice, video, messaging and/or data. The exemplary embodiments can be utilized to provide service continuity between other types of networks such as a WiMAX network, as well as between more than two access networks such as from a RAN to a WiFi network and back to the RAN or to another access network, such as a WiMAX network.

Signal flow 600 depicts steps 1 which are initiated by the WiFi client on the end user device which result in an active session over the WiFi network with the second end user device. In this example, the end user device moves out of or towards the boundary of the WiFi coverage area. An automatic movement to the RAN can be detected resulting in a REFER-to message being initiated by the WiFi client in step 3 and further resulting in steps 4-10 thereby continuing the communication session over the RAN. The exemplary embodiments can utilize various triggering events for step 3, such as user preferences, end user device performance parameters, network preferences, and/or network performance parameters. In one or more embodiments, the signaling can follow in part one or more standards. For example, one or more of steps 4-10 can be similar to signaling steps utilized by the 3GPP TS 24.229 standard, such as recipients of the messages and/or information being transferred in the messages.

Figure 7:
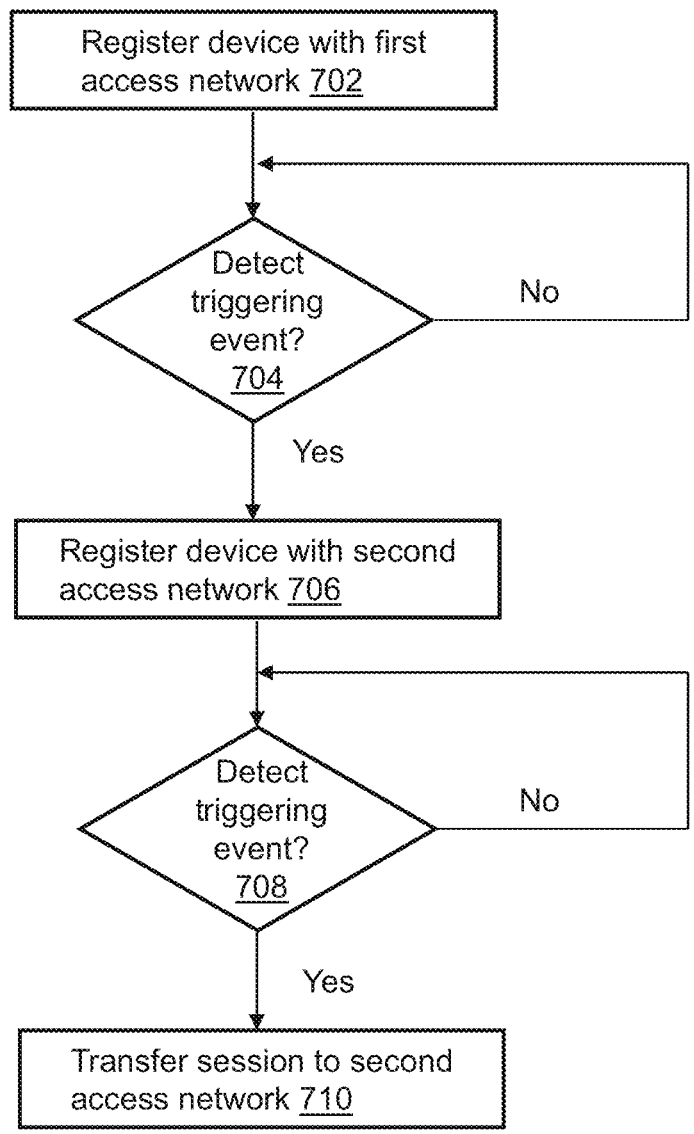
FIG. 7 depicts an illustrative embodiment of a method used in portions of the systems described in FIGS. 1 and 2 to enable service continuity utilizing co-registration.

FIG. 7 depicts an illustrative embodiment of a method 700 used by a communication device, such as a mobile device. At 702, the mobile device can register with a first access network, such as a RAN. At 704, a triggering event can be detected. The triggering event can be detected by various devices, such as by the end user device, a network element, or both. The triggering event can be a location (or change thereof) of the mobile device (e.g., moving into or in proximity of or towards a coverage area of a second access network such as a WiFi network coverage area). The triggering event can also be one or more other criteria or thresholds, such as user preferences, end user device performance parameters, network preferences, and/or network performance parameters. In one or more embodiments, various monitoring can be performed in conjunction with the determining of the triggering event, such as monitoring QoS of the RAN service, signal power levels, network traffic, device power consumption, and so forth.

If a triggering event is detected, such as the mobile device has entered the coverage area of a second access network then at 706 a co-registration can occur. The co-registration can include maintaining the registration with the first access network while registering with the second access network. In one embodiment, the co-registration can be performed by utilizing the same proxy SIP REGISTRAR server of the IMS CN that performed the first registration.

At 708, another triggering event can be detected. The triggering event can be detected by various devices, such as by the end user device, a network element, or both. The triggering event can be an automatic movement by the end user device to transfer the session to the second access network. The other triggering event can also be one or more other criteria or thresholds, such as user preferences, end user device performance parameters, network preferences, and/or network performance parameters. In one or more embodiments, various monitoring can be performed in conjunction with the determining of the other triggering event, such as monitoring QoS of the RAN service, signal power levels, network traffic, device power consumption, and so forth. At 710, the session can be transferred from the first access network to the second access network, such as transferring a voice, video, messaging and/or data communication session from the RAN to a WiFi network, or vice versa.

In one embodiment, an AKA order of operation on ISIM can be as follows: 1) Calculate AK where $AK=f5_K(RAND)$; 2) Identify SQN where $SQN=(SQN \text{ Å } AK) \text{ Å } AK$; 3) Compute XMAC where $XMAC=f1K (SQN\|RAND\|AMF)$; 4) Compare MAC (from AUTN) and XMAC.; 4A) If MAC !=XMAC then authentication failure; 4B) If MAC=XMAC then go to next step; 5) Verify HSS's $SQN_{HE}$ derived from AUTN is within range (32) of the ISIM's $SQN_{MS}$. 5A) If not within range then synchronization failure, compute AUTS and respond; 5B) If within range then continue to next step; 6) Compute RES and include in "response" parameter in SIP Registration authentication header.

In one or more embodiments, multiple forms of media services can be offered to media devices over wireless technologies according to wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure where the signaling protocol of the service is SIP based or in general supports a registration method prior to initiating a service data transfer session (e.g., voice, video, messaging and/or data).

Figure 8:
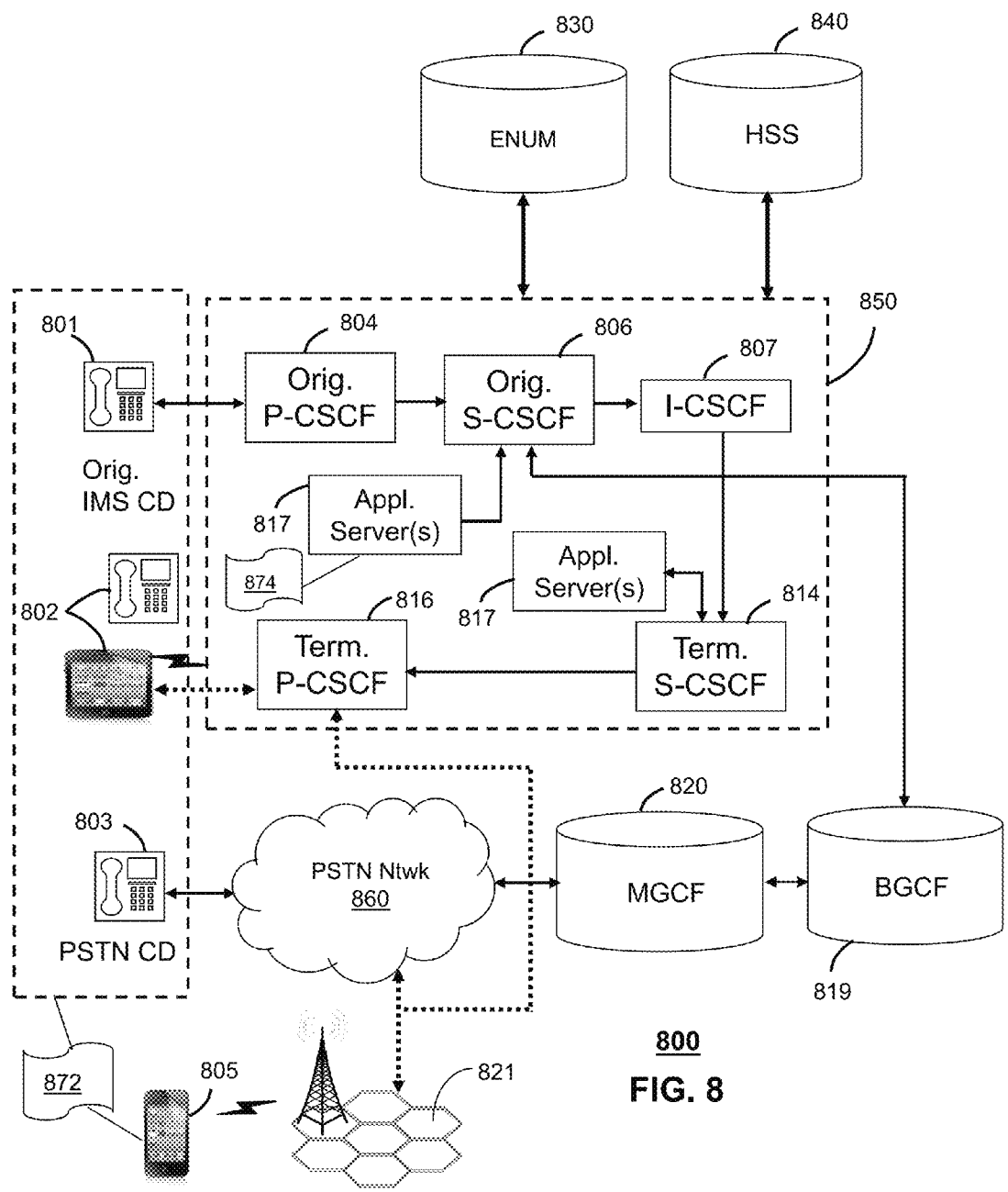
FIG. 8 depicts an illustrative embodiment of a communication system that provides media services including continuity of services for a communication device.

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with systems 100 and 200 of FIGS. 1 and 2 as another representative embodiment of communication system 800. System 800 enables service continuity for an end user device over multiple access networks utilizing a co-registration process.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 400 of FIG. 4.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 817 can perform function 874 (which can be embodied in hardware and/or software) which includes enable co-registration of two or more access networks, such as enabling registration of an end user device with a WiFi network while maintaining the registration of the end user device with respect to a RAN. Server 817 can perform function 874 and thereby provide service continuity to the CDs 801, 802, 803 and 805 of FIG. 8 over different access networks. CDs 801, 802, 803 and 805 can be adapted with hardware and/or software to perform function 872 to utilize the co-registration and service continuity enabled by the server 817. Software 872 can include dedicated user agents that run on the end user devices which are dedicated to particular access networks to facilitate co-registration via the IMS network 850 by the end user device to those access networks.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

A number of the exemplary embodiments describe a co-registration process for two or more access networks which is facilitated by an IMS core, such as through use of a proxy SIP REGISTRAR server. The exemplary embodiments can perform the co-registration process in a number of different ways utilizing various networks, systems or components that may or may not include the IMS core or the proxy SIP REGISTRAR server. In one embodiment, the co-registration process within an IMS core can be a dedicated process handled by another network element of the IMS core that is in communication with the proxy SIP REGISTRAR server Some of the exemplary embodiments describe co-registration of different access networks (e.g., a RAN and a WiFi access network). One or more of the exemplary embodiments can enable co-registration of the same types of access networks that are otherwise different networks, such as co-registration of first and second WiFi access networks that are managed by different service providers. In one embodiment, the co-registration of the same types of networks can enable flexibility in selection for the end user device such as based on costs of the different providers, compatible services of the different providers, and so forth. In other embodiments the co-registration can be a combination of different access network types and same access network types.

Figure 9:
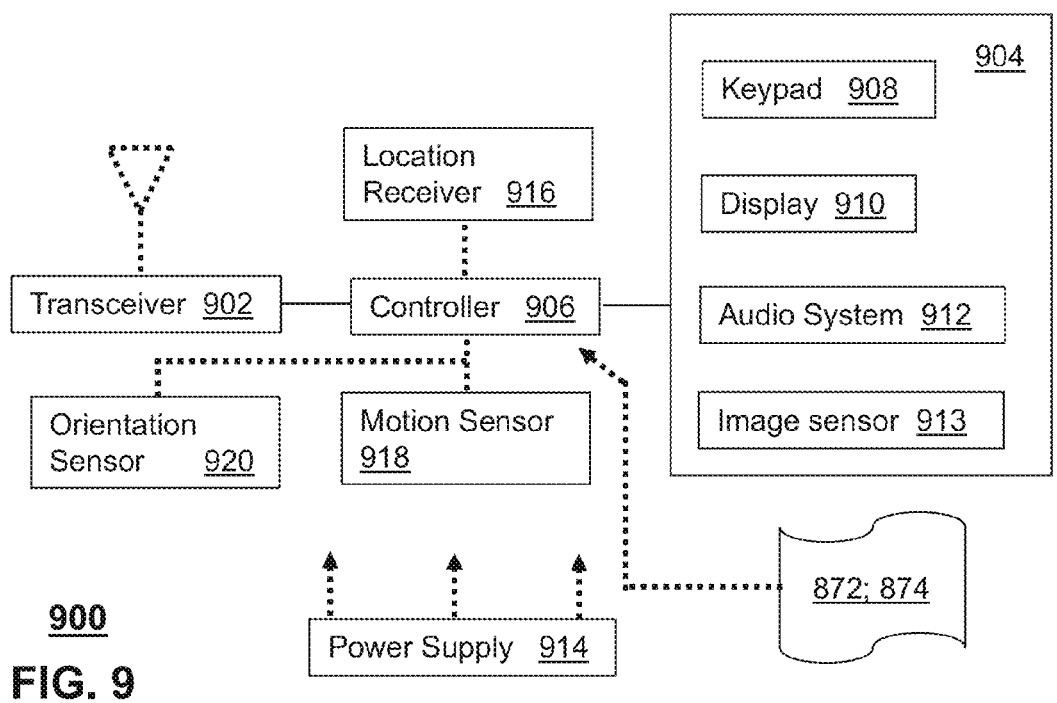
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1-6 and 8. Communication device 900 in whole or in part can represent any of the communication devices described in FIGS. 1-6 and 8 and can be configured to perform all or portions of method 700 of FIG. 7.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of devices of FIGS. 1-6 and 8. It will be appreciated that the communication device 900 can also represent other devices that can operate in systems associated with FIGS. 1-6 and 8. The controller 906 can be adapted in various embodiments to perform the functions 872 and/or 874 including performing co-registration, detecting triggering events for initiating the co-registration, performing service transfer over a different access network utilizing co-registration, detecting triggering events for initiating the service transfer over the different access network utilizing the co-registration.

Upon reviewing the aforementioned embodiments, it would be evident to an artisan with ordinary skill in the art that said embodiments can be modified, reduced, or enhanced without departing from the scope of the claims described below. For example, co-registration can be performed with more than two access networks. In one or more embodiments, performing co-registration and/or performing session transfer to the new access network according to co-registration can be based on a device negotiation process that takes into account various factors, such as user preferences, end user device performance parameters, network preferences and/or network performance parameters.

One or more exemplary embodiments can provide information to the end user indicating when a co-registration has been initiated or completed. For example, a WiFi icon can be displayed on the touch screen display 910 so that a user knows that the device 900 has registered with a WiFi access network. In one embodiment, manipulation of the co-registration icon can enable a user to permit or deny a transfer of a communication session to another access network, such as a drag and drop of the co-registration icon into a delete bin shown on the display 910. In another embodiment, co-registration icons can be displayed on the display 910 to enable the end user to select among different available access networks. For example, a group of available access networks (that the end user device has co-registered with) can be displayed in a prioritized list to facilitate a selection by the end user. In one embodiment, the icons can include information with respect to the access networks to facilitate the selection such as predicted signal strength, network traffic conditions, costs, available services, and so forth. In one embodiment, the size of the icon can be adjusted to represent different features of the access networks such as providing larger icons for access networks that are predicted to have better quality of service or signal strength.

In another embodiment, icons can be presented to enable adjusting the communication session when it is switched to the new access network. For example, an icon can be presented that shows that the voice call communication session currently occurring over the RAN can be adjusted to a voice/video call when the session is seamlessly transferred over to a WiFi access networks based on the co-registration process. Combinations of these features can also be utilized such as showing available networks and showing available services (with or without other information such as cost) for each of the available networks. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
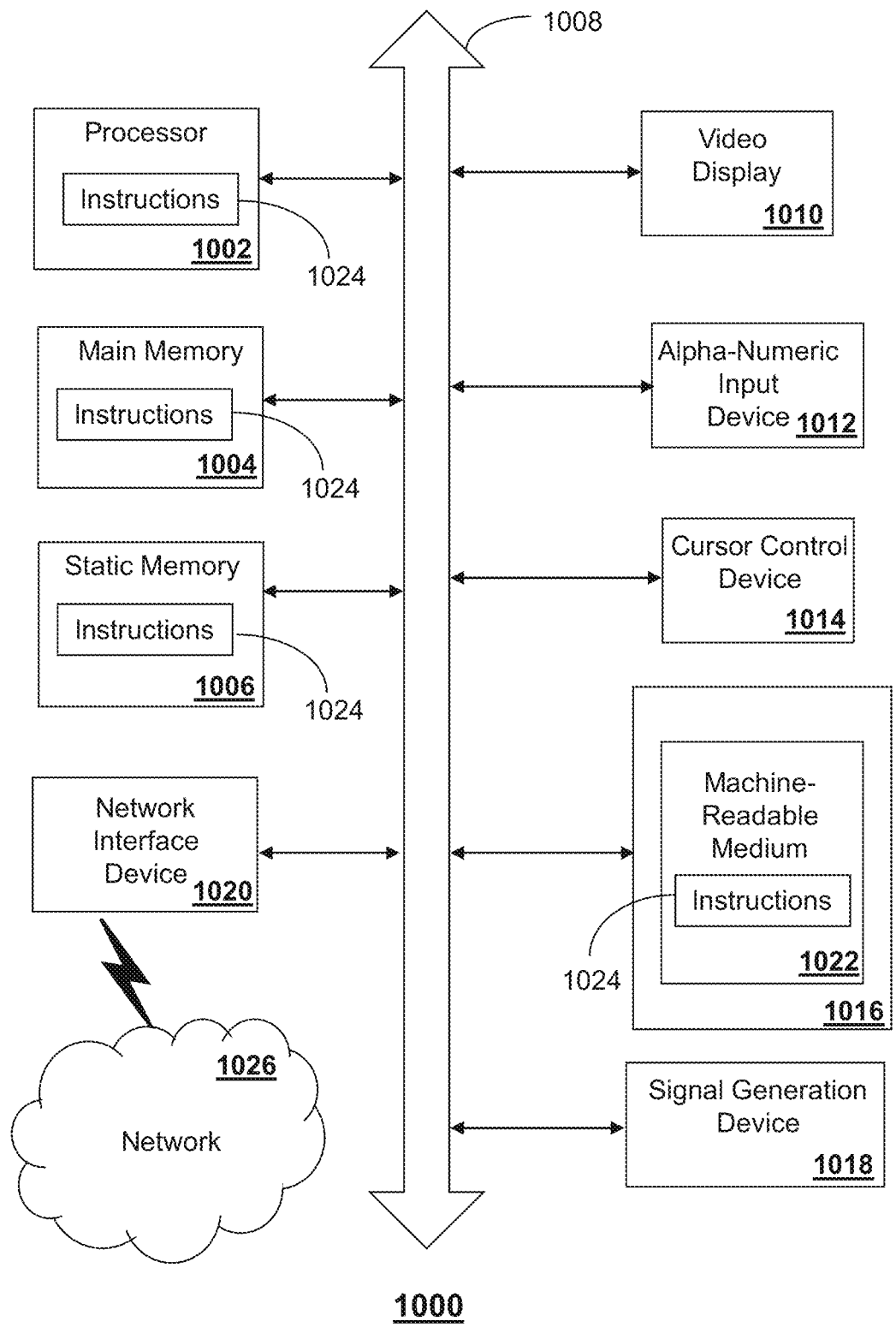
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the end user device and/or the SIP REGISTRAR server to enable co-registration of an end user device with multiple access networks and/or to enable service continuity for the end user device between different access networks where co-registration has occurred. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, messaging and/or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, comprising:
   registering with a first access network to generate a first registration;

detecting a triggering event; and
responsive to the detecting of the triggering event, registering with a second access network to generate a second registration while maintaining the first registration with the first access network,
wherein the registering with the first access network and with the second access network is performed at least in part by a plurality of user agents communicating with a same registrar server, the user agents resident on the device, wherein the registrar server comprises an Internet Protocol Multimedia Subsystem (IMS) proxy server, wherein the user agents communicate with the registrar server using a same IMS public user identifier and using different IMS private identifiers respectively, and wherein the first registration and the second registration are associated with a same service identity module of the device.

2. The device of claim 1, wherein the triggering event comprises a change in location of the device with respect to a coverage area of the second access network.

3. The device of claim 1, wherein the second registration includes associating a user of the device with a service profile.

4. The device of claim 1, wherein the first access network is a radio access network, and wherein the second access network is a wireless local area network.

5. The device of claim 1, wherein the plurality of user agents comprise a dedicated first user agent for registering with the first access network and a dedicated second user agent for registering with the second access network.

6. The device of claim 1, wherein the first and second registrations utilize the same IMS public user identifier and different IMS private identifiers and wherein at least one of the IMS private identifiers is derived from a private identifier parameter of the service identity module.

7. The device of claim 1, wherein the operations further comprise:
initiating an invitation message from a second dedicated user agent that initiated the registering with the second access network, wherein the second dedicated user agent is resident on the device, and wherein the invitation message causes a transfer of a communication session from the first access network to the second access network.

8. The device of claim 1, wherein the operations further comprise:
initiating a refer-to message from a first dedicated user agent that initiated the registering with the first access network, wherein the first dedicated user agent is resident on the device, and wherein the refer-to message causes a transfer of a communication session from the first access network to the second access network.

9. A non-transitory machine-readable storage medium, comprising executable instructions that, when executed by a processing system including a processor of a mobile device, facilitate performance of operations, comprising:
determining to transfer a communication session of the mobile device from a first access network to a second access network, wherein the mobile device is registered with the first and second access networks, wherein registering of the mobile device with the first access network and with the second access network is performed at least in part by a plurality of user agents communicating with a same registrar server, the user agents resident on the mobile device, wherein the registrar server comprises an Internet Protocol Multimedia Subsystem (IMS) proxy server, wherein the user agents communicate with the registrar server using a same IMS public user identifier and using different IMS private identifiers respectively, and wherein the plurality of user agents are associated with a same service identity module of the mobile device; and
generating a message from a user agent corresponding to one of the first or second access networks, thereby causing the transfer of a communication session from the first access network to the second access network.

10. The non-transitory machine-readable storage medium of claim 9, wherein the operations further comprise maintaining a first registration with the first access network after the transfer of the communication session from the first access network to the second access network and wherein the message is one of an invitation message or a refer-to message.

11. The non-transitory machine-readable storage medium of claim 9, wherein the message comprises an invitation message, and wherein the user agent is a dedicated user agent for initiating a registration with the second access network.

12. The non-transitory machine-readable storage medium of claim 11, wherein the second access network is a wireless local area network.

13. The non-transitory machine-readable storage medium of claim 9, wherein the message comprises a refer-to message, and wherein the user agent is a dedicated user agent for initiating a registration with the first access network.

14. The non-transitory machine-readable storage medium of claim 13, wherein the first access network is a radio access network.

15. The non-transitory machine-readable storage medium of claim 9, wherein a registration with the second access network includes an association of a user of the mobile device with a service profile.

16. The non-transitory machine-readable storage medium of claim 9, wherein the mobile device is registered with the first and second access networks utilizing the same IMS public user identifier and different IMS private identifiers.

17. A method comprising:
receiving, by a processing system including a processor, a first registration message generated at a mobile device;
registering, by the processing system, the mobile device with a first access network to generate a first registration in response to the first registration message;
receiving, by the processing system, a second registration message generated at the mobile device; and
registering, by the processing system, the mobile device with a second access network to generate a second registration in response to the second registration message, wherein the first registration of the mobile device with the first access network is maintained by the system,
wherein the registering with the first access network and with the second access network is performed at least in part by a plurality of user agents communicating with a same registrar server, the user agents resident on the mobile device, wherein the registrar server comprises an Internet Protocol Multimedia Subsystem (IMS) proxy server, wherein the user agents communicate with the registrar server using a same IMS public user identifier and using different IMS private identifiers respectively, and wherein the first registration and the second registration are associated with a same service identity module of the mobile device.

18. The method of claim 17, wherein the registering with the first and second access networks utilizes the same IMS public user identifier and different IMS private identifiers from a same device, and wherein at least one of the IMS private identifiers is derived from a private identifier parameter of the service identity module.

19. The method of claim 17, wherein the first access network comprises a radio access network, and wherein the second access network comprises a wireless local area network.

20. The method of claim 17, wherein the system maintains the first registration with the first access network after a transfer of a communication session of the mobile device from the first access network to the second access network.

* * * * *